United States Patent

[11] 3,624,428

| [72] | Inventors | Paul Kessler Weimer<br>Princeton;<br>Frank Vanloon Shallcross, Princton Junction, both of N.J. |
|---|---|---|
| [21] | Appl. No. | 21,250 |
| [22] | Filed | Mar. 20, 1970 |
| [45] | Patented | Nov. 30, 1971 |
| [73] | Assignee | RCA Corporation |

[54] ELECTRIC SIGNAL PROCESSING CIRCUIT EMPLOYING CAPACITIVELY SCANNED PHOTOTRANSISTOR ARRAY
12 Claims, 11 Drawing Figs.

[52] U.S. Cl. ............................................. 307/311, 307/304, 315/169 R
[51] Int. Cl. ..................................................... H03k 17/00
[50] Field of Search .......................................... 307/311; 250/117; 317/235 N; 315/169

[56] References Cited
UNITED STATES PATENTS
| 3,369,132 | 2/1968 | Fang et al. .................... | 307/311 X |
| 3,493,912 | 2/1970 | Weimer ........................ | 307/311 X |

OTHER REFERENCES
Integrated Arrays of Silicon Photodetectors for Image Sensing by Dyck et al., IEEE Transactions, Vol. ED- 15, No. 4, Apr. 1968

*Primary Examiner*—Donald D. Forrer
*Assistant Examiner*—B. P. Davis
*Attorney*—Glenn H. Bruestle

ABSTRACT: A signal processing circuit employing an array of photodetector elements, with each element including a phototransistor having a capacitor coupled to the base region. The base-collector junction integrates incident light flux in response to an electromagnetic input, while the emitter-base diode serves as a switch when the element is sampled, to provide an electric output representative of the integrated light. The capacitor provides charge storage during the period between light flux integration and sampling.

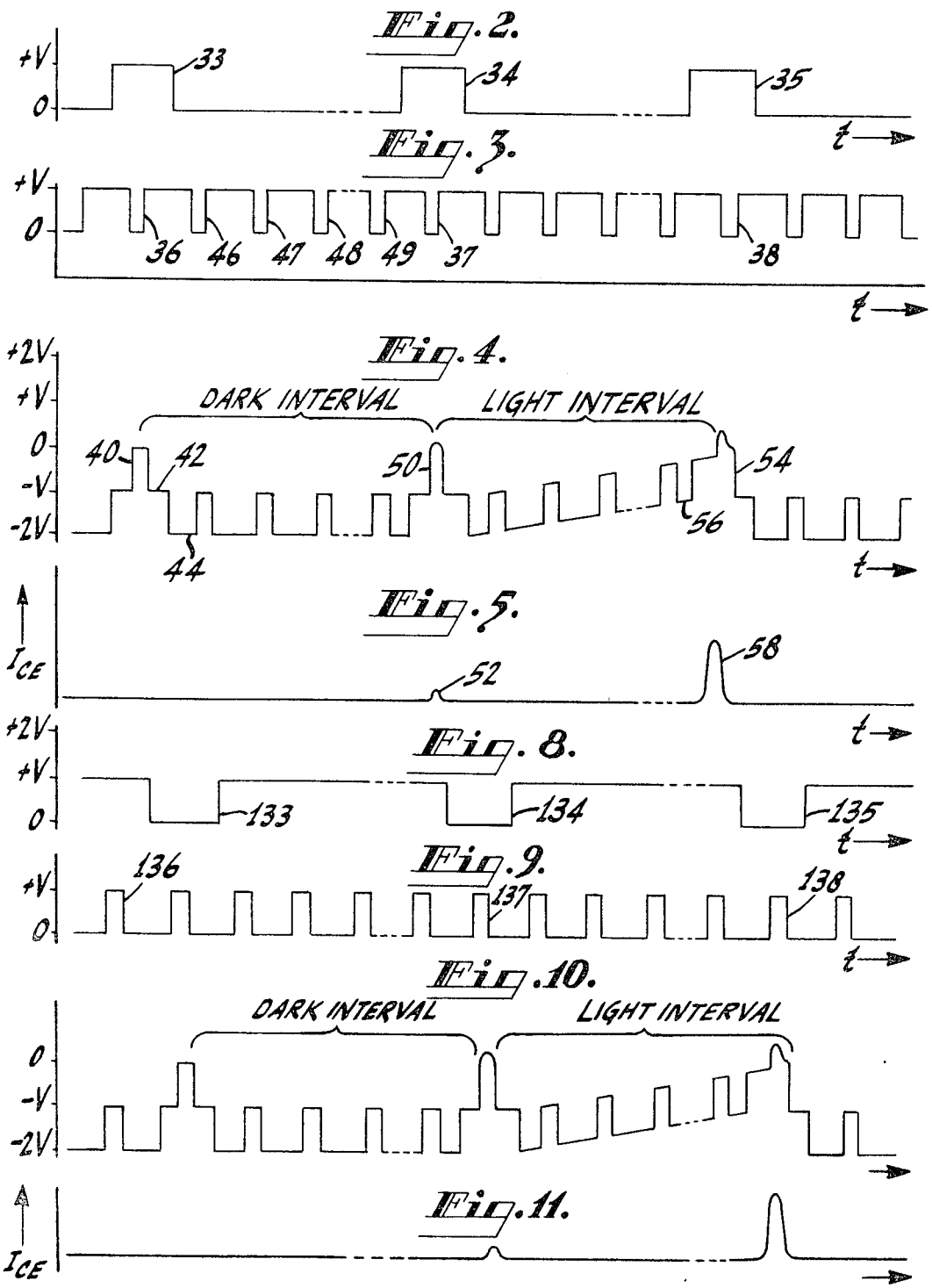

INVENTORS
PAUL K. WEIMER &
FRANK V. SCHALLCROSS
BY
Attorney

ELECTRIC SIGNAL PROCESSING CIRCUIT EMPLOYING CAPACITIVELY SCANNED PHOTOTRANSISTOR ARRAY

BACKGROUND OF THE INVENTION

The present invention relates to signal processing circuits, and more particularly, relates to that type of processing circuit which employs an image sensor array of semiconductor photodetectors to provide an electric signal voltage representative of an electromagnetic input.

One type of prior image sensor array employs a photodiode which is operated in the so-called "charge storage" mode, a mode of operation similar to that employed in an electron beam scanned vidicon. Charge storage operation is based on the principle that a reverse-biased PN-junction will lose charge stored on the junction capacitance at a rate which is a function of the intensity of light falling on the junction. Photon-generated charge passing through a reverse-biased junction is directly proportional to the integrated sum of the illumination taken over a scanning interval. Thus, by measuring the current which flows through each scanning pulse to recharge the junction capacitance to a predetermined level, it is possible to obtain a signal which is proportional to the integrated illumination. The principal advantage of this mode of operation is that it permits the use of relatively insensitive photodetectors to obtain a high operating sensitivity.

Prior solid-state image sensing devices adapted to operate in the charge storage mode have been operated successfully, but have suffered from certain disadvantages. Those which have been fabricated as thin film arrays have suffered from instability and low sensitivity. Those which have been fabricated as monolithic integrated arrays have been relatively complex, and are difficult to make with enough elements in a sufficiently small area so as to provide resolution suitable for some applications, for instance television.

Another type of solid-state array, which is operated in the charge storage mode, employs a voltage-independent capacitor serially coupled to each photodiode. This capacitor provides the charge storage function, allowing the photodiode to function as both a phototransistor and as a switch. Such a photodiode-capacitor array is disclosed by Weimer et al., in IEEE Spectrum, Vol. 6, No. 3, Mar., 1969, at page 61.

Yet another approach to solid-state image sensors employs a phototransistor at each element in the array. One example of a phototransistor array operating in the charge storage mode is disclosed by Anders et al., in the IEEE *Transactions on Electron Devices*, Vol. ED-15, No. 4, Apr., 1968, at page 191. A second phototransistor arrangement employs an MOS transistor in series with the phototransistor emitter to perform the switching function; this array is described by Weckler et al., in the IEEE *Transactions on Electron Devices*, supra, at page 196.

Phototransistor arrays such as those described above, provide full charge storage and current gain at each element of the array. However, those arrays are difficult to fabricate with sufficiently close spacing for high density area utilization.

SUMMARY OF THE INVENTION

The electric signal processing circuit of the present invention comprises a phototransistor of the type having an emitter region, a base region, and a collector region. The transistor includes a first PN-junction between the emitter and base regions, and a second PN-junction between the base and collector regions. The PN-junctions serve as photodetectors which are electrically responsive to an electromagnetic input. The circuit further includes a capacitor serially coupled to the base region of the phototransistor, and also includes means for reverse-biasing the PN-junctions.

THE DRAWING

FIGS. 2–5 are diagrams illustrating the operation of the circuit of FIG. 1.

FIGS. 8–11 are diagrams illustrating the operation of the circuit of FIG. 7.

DETAILED DESCRIPTION

Figure 1:
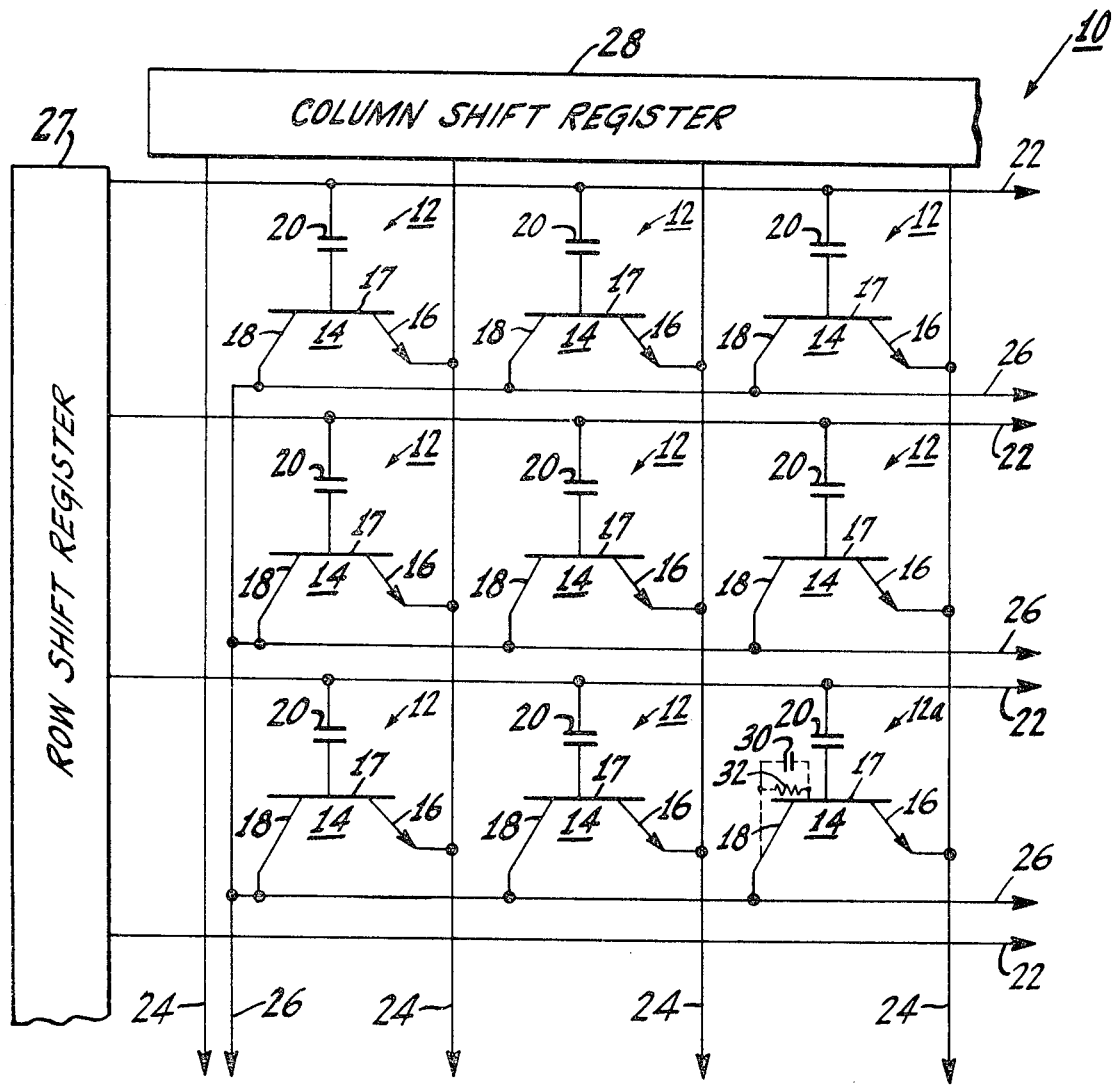
FIG. 1 is a schematic representation of one embodiment of the present circuit.

One embodiment of the circuit of the present invention is shown in FIG. 1. The circuit includes an array of image sensor storage elements. Each element comprises a phototransistor having a capacitor serially coupled to its base region.

The circuit 10 includes a plurality of image sensor storage elements 12 arranged in an array of rows and columns. Each element comprises a phototransistor 14 having an emitter, base, and collector region 16–18, respectively. The phototransistor 14 may be an NPN or a PNP device; however, an NPN device is shown in the circuit 10 of FIG. 1. While the phototransistors 14 are shown schematically in FIG. 1, it will be understood that each phototransistor 14 further includes a first PN-junction between the emitter region 16 and the base region 17, and a second PN-junction between the base region and the collector region 18, which are hereinafter shown and described with reference to FIG. 6. Each storage element 12 further includes a capacitor 20 serially coupled to the base region 17 of each phototransistor 14. The value of the capacitor 20 is not critical; preferably, however, the value exceeds the inherent capacitance of the first and second PN-junctions. In one form of this embodiment, the value of the capacitor 20 is independent of voltage.

The circuit 10 also comprises a plurality of row conductors 22 and a plurality of column conductors 24, with each one of the row conductors 22 being positioned transverse to each one of the column conductors 24 at an insulated intersection therebetween. The circuit 10 further includes means for sequentially applying a scan pulse to the row conductors 22 and a scan pulse to the column conductors 24, for example, row and column shift registers 27 and 28, respectively. Preferably, the column conductors 24 are positioned normal to the row conductors 22.

As shown in FIG. 1, each one of the row conductors 22 is capacitively coupled to the base region 17 of each phototransistor 14 in the corresponding row, through the capacitor 20 associated with each phototransistor. Each one of the column conductors 24 is connected to the emitter region 16 of each phototransistor 14 in the corresponding column, and the collector region 18 of each phototransistor is connected to a common electrode 26. Alternatively, the column conductors 24 may be connected to the collector region 18 of each phototransistor and the emitter region 16 connected to the common electrode 26; however, the column conductor-to-emitter connection is preferred.

The operation of the circuit will be described with reference to FIGS. 1–5. As shown at one of the storage elements 12a in the lower right-hand corner of FIG. 1, the base-collector PN-junction of each phototransistor 14 has an inherent capacitance and back resistance across that junction. This capacitance and resistance are numbered 30 and 32, respectively, in FIG. 1. When the junction is not illuminated, this resistance is very high and consequently, the charge on the capacitor 20 associated with element 12a is preserved. However, if the base-collector junction is illuminated, the internal resistance 32 is lowered because of the generation of photocarriers in response to the light energy falling on the junction; this lowered resistance allows the charge on the capacitor 20 to leak off.

The amount of illumination falling on each storage element may then be determined by electronically scanning the array of elements in the following manner. Noting FIG. 2, a sequence of row scan pulses, such as pulses 33–35, are impressed on each row conductor 22 by the row shift register 27 in FIG. 1. Row scan pulses 33–35 are assumed to be impressed sequentially on the row conductor 22 associated with the element 12a. Each row scan pulse is relatively long in duration, and is at least as long as the time required for the column shift register 28 to complete one cycle of its operation. Noting FIG. 3, a sequence of column scan pulses, including pulses 36–38, are impressed on each column conductor 24 by the column shift register 28. Column scan pulses 36–38 are assumed to be impressed on the column conductor 24 associated with element 12a. As shown in FIG. 3, each column scan pulse is formed by "stepping" the DC bias of the column shift register 28 negative to ground (zero level in FIGS. 2 and 3) for a time duration shorter than each row scan pulse. The period of time between each column pulse is equal to, or longer than, the duration of each row scan pulse so that only one column pulse occurs during each row scan pulse. By way of example, the row scan pulse may be 63.0 microseconds in duration, the column pulse may be 0.1 microsecond in duration, and the time between the successive column pulses may be 63.0 microseconds. During the entire operating cycle of both row column and scan pulse, the common electrode 26 is positive with respect to ground.

While a 3×3 array is shown in FIG. 1, it will be understood that a much larger array may be employed within the scope of the present invention; further, the number of column scan pulses actually employed is, in turn, dependent on the number of sensor elements actually employed in each column. The voltage levels shown at the ordinate of FIGS. 2 and 3 are by way of example only, since the array will function in the intended manner with voltage levels other than that illustrated.

With the capacitor 20 connected to the base region 17 of element 12a, as previously described, the potential at the point of connection between the capacitor and the base region is determined by the bias potential of the emitter-base junction. However, both the row column and scan pulses have such a polarity that the pulses add, and each tends to forward bias the emitter-base junction. Therefore, each of the row and column scan pulses causes the base region 17 to become negative relative to the emitter region 16, during the period between pulses. Upon coincidence of the row and column scan pulses, the capacitor and emitter-base combination is driven to the point of forward conduction.

FIG. 4 is a plot of the potential of the base region 16 of the phototransistor 14 in element 12a relative to its emitter 16. As illustrated, during this interval between the row and column scan pulses, this potential is substantially negative. Upon the application of the scan pulses 33 and 36 on the associated row and column conductors 22 and 24, this potential is driven positive to zero, as indicated by the portion 40 of the curve in FIG. 4. Current flows through the base-emitter circuit to charge the capacitor 20 which is serially connected to the base region 17.

At the termination of the pulse 36 on the column conductor 24, the potential of the base relative to the emitter is driven to some value less than zero, as indicated by the portion 42 of the curve in FIG. 4. Then, at the end of the pulse 33 on the row conductor 22, this potential is driven further negative to a value indicated by the portion 44 of the curve in FIG. 4; thereafter each repeated pulse on the column conductor 24, such as column pulses 46–49 in FIG. 3, has no effect on the element 12a under consideration, since those pulses are not of sufficient magnitude alone to bring the base-emitter circuit into forward conduction.

After a complete scanning cycle, the row and column scan pulses again coincide at the element 12a, as indicated by pulses 34 and 37 of FIG. 1. Relatively little charge has been lost by the capacitor 20 (if the element 12a has not been illuminated). Consequently, only a small current will flow from the emitter 16 to the collector 18 as shown by the pulse 52 of the curve in FIG. 5, which represents the amplified current through the emitter-collector circuit. This pulse 52 is caused by charge leakage from the capacitor 20 during the dark condition. Using proper fabrication techniques, this pulse is very small.

After another scanning interval, the row and column scan pulses again coincide, as shown by scanning pulses 35 and 38 of FIGS. 2 and 3, and the portion 54 of the curve of FIG. 4. Assuming that there has been a condition of illumination on element 12a in the interval between the portions 50 and 54 of the curve in FIG. 4, the back resistance of the base-collector PN-junction will be much lower than in the dark condition previously described, and charge will have leaked from the capacitor 20 through the base-collector junction. This leakage is represented in FIG. 4 by the upward slope 56 of the curve in FIG. 4. Consequently, the capacitor 20 of element 12a will be charged at some voltage less than the maximum, and current will be required to recharge the capacitor to its maximum value. The amount of current again will be proportional to the amount of light which has fallen on element 12a in the period between scans; this current is then amplified in the emitter-collector circuit by the gain of the phototransistor 14 as shown at current pulses 58 in FIG. 5. This video pulse may be derived from the column conductors 24, or the common electrode 26.

The sensing elements 12 of the circuit 10 have been described in operation for television-type image translation. A suitable scanning system for this type of operation is known and described, for example in Weimer et al. "A Self Scanned Solid State Image Sensor" 55 Proc. IEEE 1591, at page 1593, Sept., 1967.

Figure 6:
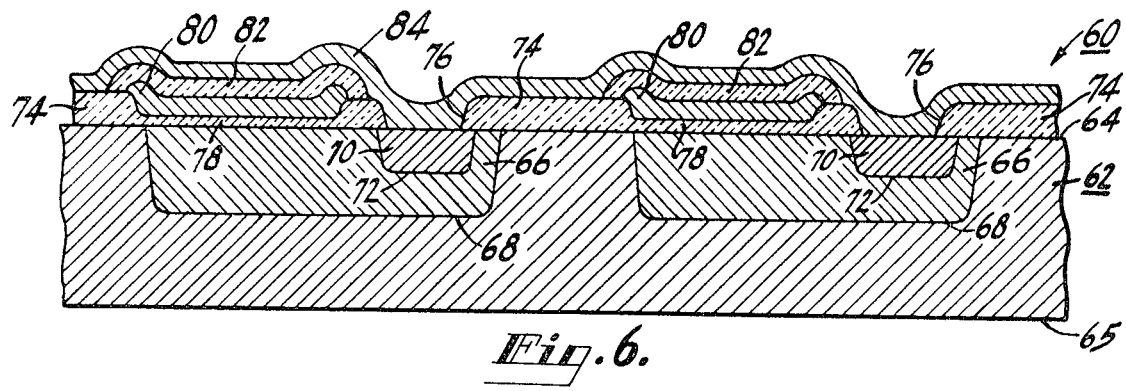
FIG. 6 is a cross-sectional view of a monolithic integrated semiconductor device exemplifying one structure of the circuit of FIG. 1.

One manner in which the circuit 10 of FIG. 1 may be fabricated in monolithic integrated form is shown in FIG. 6. The integrated structure 60 includes a semiconductor substrate 62, preferably N-type silicon, which serves as the collector region 18 of each phototransistor 14 of FIG. 1, and also serves as the common electrode 26 for deriving the video output signal from each sensing element 12. The substrate 62 has an upper surface 64 and a lower surface 65 thereon. Disposed within the substrate 62 and extending therein, in a planar fashion from the surface 64, is a plurality of P-type semiconductor regions 66. Each P-type region 66 serves as the base region 17 of each phototransistor 14 of FIG. 1. Between each P-type region 66 and the N-type substrate 62 is a base-collector PN-junction 68 which serves as a photodetector for each sensing element, as previously described with reference to FIG. 1. Preferably, the base regions 66 are disposed into the substrate 62 in an X-Y array of row and columns.

A planar N-type emitter region 70 is disposed in each P-type base region 66 from the surface 64. Between each emitter region 70 and each base region 66 is an emitter-base PN-junction 72 which controls the conduction in the emitter-collector circuit, as previously described.

Overlying the top surface 64 of the substrate 62 is an insulating coating 74; the coating 74 has apertures 76 with each aperture exposing a portion of a corresponding emitter region 70 at the top surface 64. Those portions 78 of the coating 74 which are adjacent each base region 66 at the surface 64 are preferably thinner than the remainder of the coating, as is shown in FIG. 6. A conductive layer 80 is disposed over the thin portion 78 of the coating 74. The conductive layer 80 comprises the row conductor 22 for each element of the circuit 10 of FIG. 1, and with the thin portion 78 of the insulating coating 74, forms a voltage-independent capacitor, which is serially coupled to each base region 66.

The structure 60 further includes a layer of crossover dielectric 82 which is disposed over a portion of the row conductor layer 80. A second conductive layer 84 disposed over the crossover dielectric 82 and the insulating coating 74 provides the column conductors 24 of the circuit 10 in FIG. 1. The column conductive layer 84 makes contact to the emitter region 70 in each column through the apertures 76 in the coating 74. The monolithic structure 60 may be made by well-known semiconductor integrated circuit fabrication techniques, and is therefore not described herein.

The integrated structure 60 of FIG. 6 may be arranged so that incident light strikes either the upper surface 64 or the lower surface 65.

Figure 7:
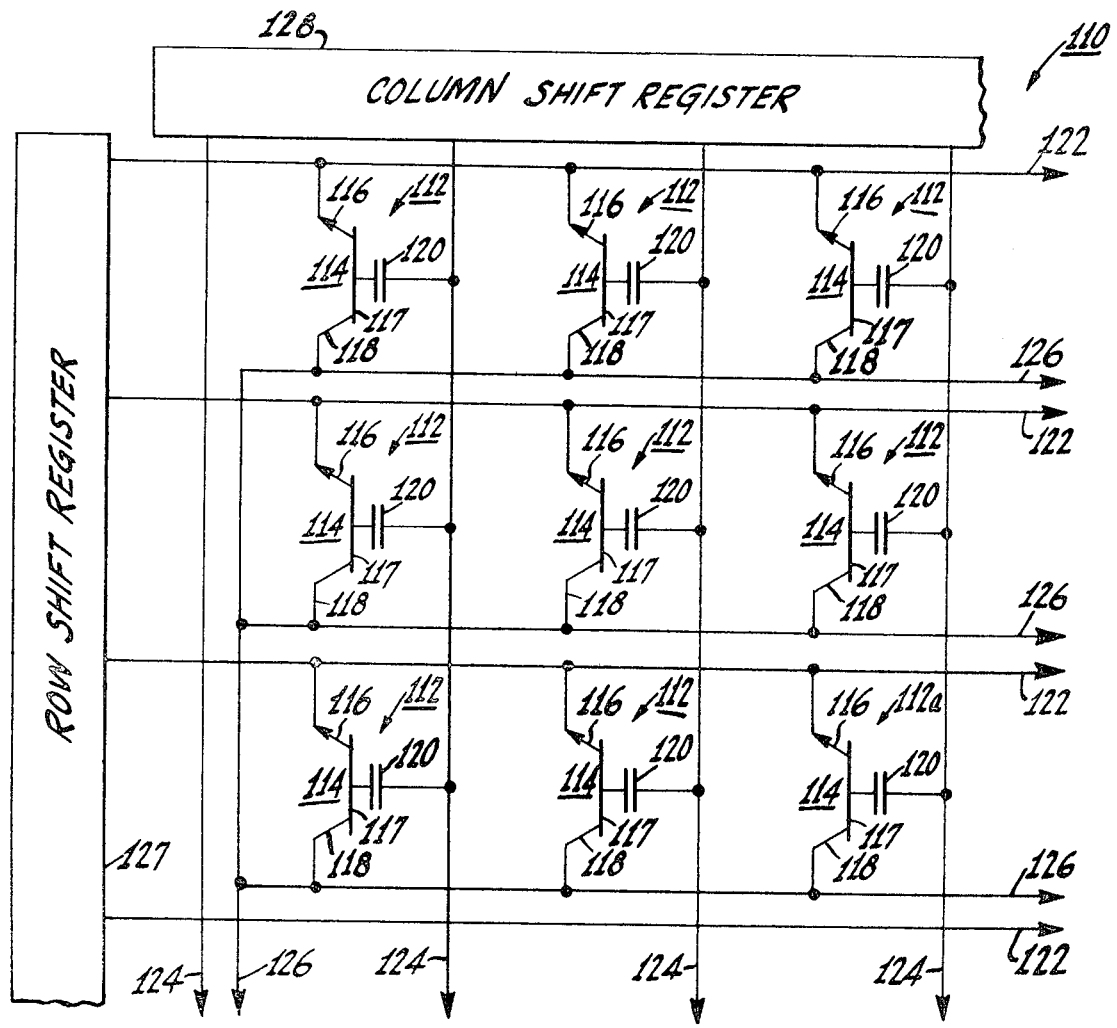
FIG. 7 is a schematic representation of an alternate embodiment of the present circuit.

An alternate embodiment of the image sensor array is shown in FIG. 7. This embodiment is essentially the same as that shown in FIG. 1, except that the base region of each phototransistor is capacitively coupled to the associated column conductor, and the emitter region is connected to the associated row conductor.

Noting FIG. 7, the alternate circuit 110 includes a plurality of sensor storage elements 112 arranged in an array of rows and columns. While a 3×3 array is also illustrated in FIG. 7, it will be understood that a much larger array may be employed.

Each storage element 112 comprises a phototransistor 114 with each phototransistor having an emitter, base, and collector region 116 to 118, respectively. Each storage element 112 further includes a capacitor 120 serially coupled to the base region 117 of each phototransistor 114. The capacitor 120 has a value similar to the capacitor 20 of FIG. 1. The alternate circuit 110 further comprises a plurality of row conductors 122 and a plurality of column conductors 124 associated with the array of elements 112, and means for sequentially applying a scan pulse to each of the conductors; for example, row and column shift registers 127 and 128, respectively. Preferably, the column conductors 124 are positioned transversely to, and are insulated from, the row conductors 122.

As shown in FIG. 7, each one of the column conductors 124 is capacitively coupled to the base region 117 of each phototransistor 114 in the corresponding column through the capacitor 120 associated with each phototransistor. Each one of the row conductors 122 is connected to the emitter region 116 of each phototransistor 114 in the corresponding row, and the collector region 118 is connected to a common electrode 126. Alternatively, the row conductors may be connected to the collector region 118 of each phototransistor and the emitter region 116 may be connected to the common electrode 126. However, the row conductor-to-emitter connection is preferred in this embodiment.

The operation of the alternate circuit 110 is essentially the same as the circuit 10 of FIG. 1 except that different row and column scan pulses are employed, in order to obtain a potential of the base region relative to the emitter region similar to that previously described.

Noting FIG. 8, a sequence of row scan pulses, including pulses 133–135, are impressed on each row conductor 122 by the row shift register 127. The row scan pulses 133–135 are similar to column scan pulses 33–35 of FIG. 2, except that pulses 133–135 are negative relative to ground.

FIG. 9 illustrates a sequence of column scan pulses, includes pulses 136–138, which are analogous to column scan pulses 36–38 of FIG. 3. During the entire operating cycle of the row and column scan pulses, the common electrode 126 is positive with respect to ground. The combination of the row and column scan pulses results in a potential of the base region 117 relative to the emitter region 116 as shown in FIG. 10. That potential is identical to that described above with reference to FIG. 4, for any sensor element 112 which undergoes the same dark interval-light interval sequence. A plot of amplified current through the emitter-collector circuit of the phototransistor 114 is shown in FIG. 11. This video pulse may be derived from the row conductors 122, or the common electrode 126.

The alternate circuit 110 may be fabricated in a monolithic semiconductor structure such as that shown in FIG. 6; except that the structure is rotated 90°, in order that the column and row conductive layers are reversed.

We claim:

1. An electrical signal processing circuit comprising:
   a phototransistor of the type including emitter, base, and collector regions;
   a first PN-junction between the emitter and base regions, and a second PN-junction between the base and collector regions, said junctions serving as photodetectors which are electrically responsive to an external electromagnetic input;
   charge storage means comprising a capacitor serially coupled to said base region; and
   means for applying voltages to said circuit so as to reverse-bias said junctions.

2. An electrical signal processing circuit according to claim 1, wherein said capacitor has a value greater than the inherent capacitance of said first and second PN-junctions.

3. An electrical signal processing circuit according to claim 2, wherein the value of said capacitor is independent of voltage.

4. An electrical signal processing circuit according to claim 2, further including:
   a plurality of row conductors and a plurality of column conductors, each one of said row conductors being positioned transverse to each one of said column conductors at an insulated intersection therebetween;
   a plurality of phototransistor-capacitor combinations, with each one of said combinations located at one of said intersections;
   the base region of each one of said phototransistors being serially coupled through said capacitors to either said row or column conductor at said intersection; and
   either the emitter region or the collector region of each one of said phototransistors connected to the other of said column or row conductor at said intersection.

5. An electrical signal processing circuit according to claim 4, further comprising the other of the collector region or the emitter region of each one of said phototransistors connected to a common electrode.

6. An electrical signal processing circuit according to claim 4, further comprising means for sequentially applying a scan pulse to said row conductors and a scan pulse to said column conductors.

7. A solid-state image sensor element, comprising:
   a phototransistor formed in a semiconductor body having a major surface;
   said transistor including emitter, base, and collector regions of alternate conductivity type, with a PN-junction between the emitter and base region, and a PN-junction between the base and collector region; and
   means defining a capacitor serially coupled to said base region at said surface, said capacitor having a value greater than the inherent capacitance of said PN-junctions.

8. A solid-state image sensor element according to claim 7, wherein portions of each region and each junction extend to said surface.

9. A solid-state image sensor element, comprising:
   a phototransistor formed in a semiconductor body having a major surface;
   said transistor including emitter, base, and collector regions of alternate conductivity type, with a PN-junction between the emitter and base regions, and a PN-junction between the base and collector regions, a portion of each region and each junction extending to said surface;
   an insulating coating overlying said surface; and
   a layer of conductive material overlying that portion of said insulating coating adjacent said base region, so that said conductive layer, said insulating coating, and a portion of said base region at said surface, form a capacitor serially coupled to said base region.

10. A solid-state image sensor array, comprising:
    a plurality of phototransistors arranged in an array of rows and columns in a semiconductor body having a major surface;
    each said transistor including an emitter, base, and collector region of alternate conductivity type, with a PN-junction between the emitter and base region, and a PN-junction between the base and collector region, a portion of each region and each junction extending to said surface;
    an insulating coating overlying said surface, said coating having a plurality of apertures with each aperture exposing a portion of one of said emitter regions at said surface;
    a plurality of row conductive layers disposed on said coating, each row conductor interconnecting the emitter regions in the corresponding row through the apertures in said coating; and a plurality of column conductive layers disposed on said coating, each said column conductor overlying that portion of said coating adjacent to the base region of each phototransistor in the corresponding column.

11. A solid-state image sensor array according to claim 10, wherein said column conductive layers are disposed transversely to, and insulated from said row conductor metal layers.

12. A solid-state image sensor array according to claim 10, further comprising said phototransistors formed in a semiconductor body, and wherein said body comprises a common electrode for one of the regions in said phototransistors.

* * * * *